US009015834B2

(12) United States Patent
Salamat et al.

(10) Patent No.: US 9,015,834 B2
(45) Date of Patent: Apr. 21, 2015

(54) MITIGATING JUST-IN-TIME SPRAYING ATTACKS IN A NETWORK ENVIRONMENT

(71) Applicant: Cisco Technology, Inc., San Jose, CA (US)

(72) Inventors: Babak Salamat, Mountain View, CA (US); Joseph Epstein, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 13/843,696

(22) Filed: Mar. 15, 2013

(65) Prior Publication Data

US 2014/0283036 A1    Sep. 18, 2014

(51) Int. Cl.
*G06F 21/00* (2013.01)
*G06F 21/51* (2013.01)

(52) U.S. Cl.
CPC ..................................... *G06F 21/51* (2013.01)

(58) Field of Classification Search
CPC ......... G06F 21/50; G06F 21/51; G06F 21/52; G06F 21/566
USPC .......................................... 726/22, 23, 25, 26
See application file for complete search history.

(56) References Cited

U.S. PATENT DOCUMENTS

| 7,596,780 | B2 * | 9/2009 | Selitrennikoff et al. ...... 717/130 |
| 2005/0071822 | A1 * | 3/2005 | DeWitt et al. ................. 717/131 |
| 2008/0098265 | A1 | 4/2008 | Dmitrovich et al. |
| 2011/0191848 | A1 | 8/2011 | Zorn et al. |
| 2013/0205388 | A1 * | 8/2013 | Hunt et al. ...................... 726/22 |

OTHER PUBLICATIONS

Piotr Bania, "JIT spraying and mitigations," Computing Research Repository—CORR, vol. abs/1009.1 (2010), 5 pages.
Adnan Bouakaz, "Predictability of Just in Time Compilation," Research Master's degree in Computer Science, Jun. 2010, 48 pages.

* cited by examiner

*Primary Examiner* — Edward Zee
(74) *Attorney, Agent, or Firm* — Patent Capital Group (57) ABSTRACT

An example method for mitigating JIT spraying attacks in a network environment is provided and includes protecting an output of a just-in-time (JIT) compiler against attacks during application execution at least by intervening from outside the application into a JIT page generated by the JIT compiler in a memory element of a host. In a specific embodiment, the intervening can include rewriting the JIT page. In specific embodiments, the method can further include generating a shadow page corresponding to the JIT page in the memory element. The method can further include randomly choosing at least one block of instructions in the JIT page, moving the at least one block of instructions to the shadow page, and replacing the at least one block of instructions in the JIT page with at least one of invalid opcodes and halt instructions.

20 Claims, 5 Drawing Sheets

MITIGATING JUST-IN-TIME SPRAYING ATTACKS IN A NETWORK ENVIRONMENT

TECHNICAL FIELD

This disclosure relates in general to the field of computer security and, more particularly, to mitigating just-in-time (JIT) spraying attacks in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. The data center network includes thousands of applications executing, sometimes concurrently, on various virtual machines. In such a context, information security can be vital to the data center network and organization. As such, there is a need for secure computing systems that provide reasonably high assurance of the effectiveness of its security controls.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for mitigating JIT spraying attacks in a network environment is provided and includes protecting an output of a just-in-time (JIT) compiler against attacks during application execution at least by intervening from outside the application into a JIT page generated by the JIT compiler in a memory element of a host. In a specific embodiment, the intervening can include rewriting the JIT page. In specific embodiments, the method can further include generating a shadow page corresponding to the JIT page in the memory element. The method can further include randomly choosing at least one block of instructions in the JIT page, moving the at least one block of instructions to the shadow page, and replacing the at least one block of instructions in the JIT page with at least one of invalid opcodes and halt instructions.

Example Embodiments

Figure 1:
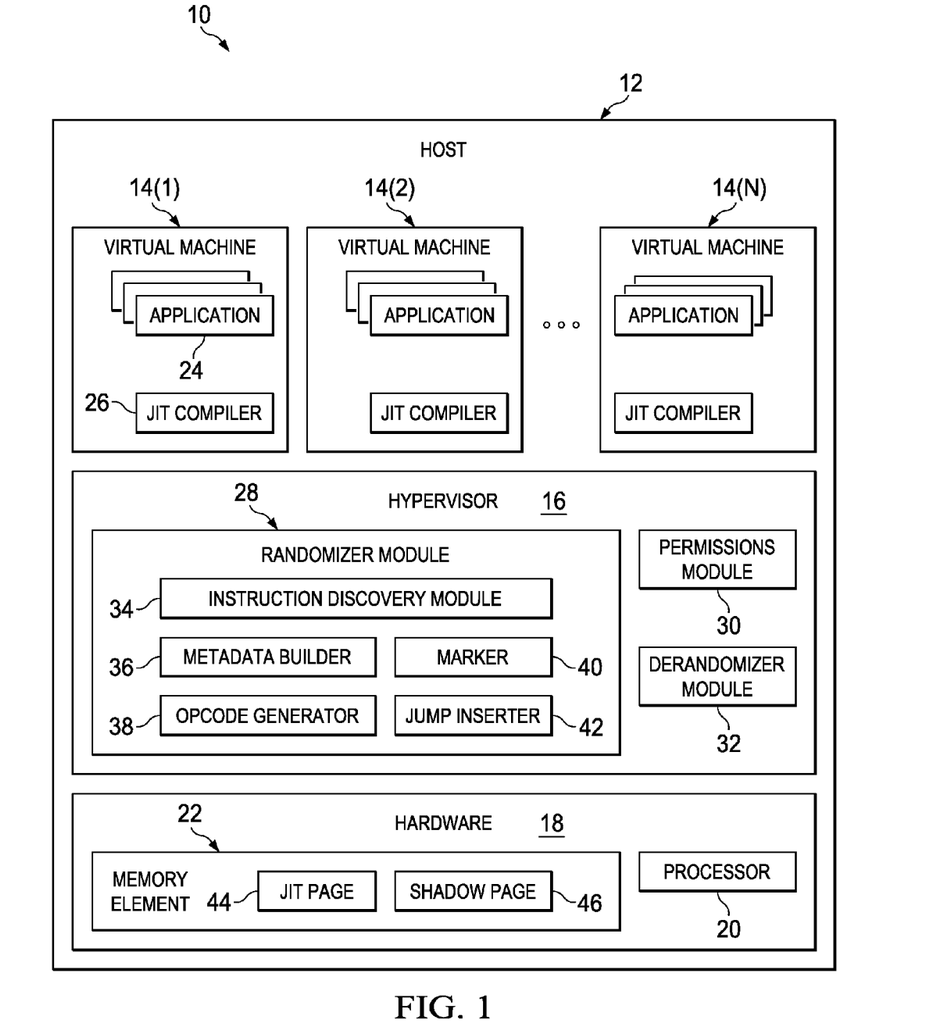
FIG. 1 is a simplified block diagram illustrating an embodiment of a system for mitigating JIT spraying attacks in a network environment.

Turning to FIG. 1, FIG. 1 is a simplified block diagram illustrating an embodiment of system 10 for mitigating JIT spraying attacks in a network environment. System 10 includes a host 12 supporting one or more virtual machines 14(1)-14(N) on a hypervisor 16, using underlying hardware 18. Hardware 18 may include a processor 20 and a memory element 22. Each virtual machine 14(1), 14(2), . . . 14(N) may include its own guest operating system, in which one or more applications 20 are executed. As used herein, the term "host" includes a computing device such as server, laptop, desktop, and smartphone. Hosts may provide data, services, applications and other such information resources to users and other nodes (e.g., any electronic device, client, server, peer, service, application, or other object capable of sending, receiving, or forwarding information over communications channels) on a network. Note also that an "application" as used herein this Specification, can be inclusive of an executable file comprising instructions that can be understood and processed on a host (such as host 12), and may further include library modules loaded during execution, object files, system files, hardware logic, software logic, or any other executable modules.

As used herein, a "virtual machine" includes a program executing on a host (e.g., host 12) that creates a self-contained operating environment and presents the appearance to a user of a separate and different computer. The virtual machine can be a software implementation of a computer that executes programs like a physical computer. As used herein, "hypervisor" includes software, hardware, firmware, or a combination thereof that can create and execute one or more virtual machines (e.g., virtual machines 14(1)-14(N)). For example, the hypervisor includes a program that allows multiple operating systems to share a single host (e.g., host 12). Each operating system appears to have the host's processor, memory, and other resources all to itself. However, the hypervisor actually controls the host's processor and other resources, allocating what is needed to each operating system in turn and facilitating the multiple operating systems operating without disrupting each other. In some embodiments, hypervisor 16 can include a privileged VM that has special privileges (e.g., to create memory pages and/or to control program execution).

In some embodiments (e.g., as shown in the FIGURE), each virtual machine 14(1), 14(2), . . . 14(N) can execute instances of applications 24 that use a JIT compiler 26 installed on respective virtual machines 14(1)-14(N). In other embodiments, an operating system of host 12 (or a dedicated virtual machine) can include a single instance of a JIT compiler that supports substantially all virtual machines 14(1)-14(N). As used herein, "JIT compiler" includes a program that turns bytecode (i.e., a platform independent program that contains instructions) into platform-specific executable code that can be immediately executed by a processor, such as processor 20, for execution. For example, a Java application's source language statements are compiled by the Java compiler into bytecode rather than into code that contains instructions that match a particular hardware platform's processor (e.g., an Intel Pentium microprocessor or an IBM System/390 processor). The bytecode is platform-independent code that can be sent to any platform and execute on that platform. The JIT compiler (e.g., JIT compiler 26) converts the bytecode into platform specific code that can be understood and executed by the platform's processor. Once the code has been (re-)compiled by the JIT compiler, the code may execute more quickly.

Hypervisor 16 can include a randomizer module 28, a permissions module 30 and a derandomizer module 32. Randomizer module 28 can include an instruction discovery module 34, a metadata builder 36, an opcode generator 38, a marker 40, and a jump inserter 42. In various embodiments, randomizer module 28, permissions module 30 and derandomizer module 32 may be a part of a daemon (e.g., software that carries out background tasks at fixed intervals or in response to specific events) executing within hypervisor 16. The daemon may operate on JIT compiler 26 (or the output thereof), monitoring access violations (if any) on one or more JIT page 44, and may manipulate one or more shadow page 46 in memory element 22 to mitigate JIT spraying attacks in the network. As used herein, the term "JIT page" refers to a memory page (e.g., contiguous block of memory that functions as a unit of data for memory allocation performed by an operating system for a program (e.g., application 20)) used by JIT compiler 26 to store a compiled program. As used herein, the term "shadow page" refers to another memory page corresponding to JIT page 44. Potentially every byte in JIT page 44 used by the program (e.g., application 20) during its execution may have corresponding shadow byte(s).

For purposes of illustrating the techniques of system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

The JIT compiler is one of the few types of programs that cannot be run in a no-executable-data environment. Therefore, JIT compilers are normally exempt from data execution prevention. However, such exemption can facilitate security exploits like JIT spraying, which is a class of computer security exploit that circumvents the protection of address space randomization (ASLR) and data execution prevention (DEP) by exploiting the behavior of JIT compilation. The JIT compiler usually generates the same sequence of native instructions for a given input (e.g., an instruction in an application's source code language) from the application. Thus, the given input produces an identical sequence of native instructions in two different compilations. Attackers feed JIT compilers with a well-crafted input that exploits such characteristics of the JIT compiler.

The JIT spray attack performs heap spraying with the code generated by the JIT compiler. The input application, typically in Javascript or ActionScript source code language, contains numerous constant values that can be erroneously executed as code. The attacker would use a suitable bug to redirect code execution into the newly generated code. For example, a buffer overflow could allow the attack to modify a function pointer or return address. This causes the processor to execute instructions in a way that was unintended by the input application. The attack is usually not limited to the expected instruction boundaries; it is possible to jump into the middle of an intended instruction to force the processor to misinterpret the instruction.

Some mitigation mechanisms to prevent JIT spraying attacks can involve modifying the JIT compiler to force it to compile the application code using various techniques designed to prevent spraying attack. For example, a randomization technique can include randomly distributing constants encountered in the application code across a plurality of memory pages; another mechanism can include surrounding the constants with a halt instruction data or non-instruction data on the page or embedding random data in the instruction data with instructions to jump over such random data; yet another mechanism can include encoding constants in the application machine code according to an encryption algorithm; yet another mechanism can include randomly laying out placement of the application machine code so that two compilations of the code would result in different placement of the machine code across virtual memory; etc. Such currently existing mechanisms require knowledge of the JIT compiler to modify its compiling operations, and mitigate spraying attacks from "within" the JIT compiler and/or the application being compiled. Thus, the JIT compiler vendor would have to integrate such mechanisms (e.g., from proprietary systems) into the JIT compiler, or provide non-standard JIT compilers that may work with some applications and fail with some others.

System 10 is configured to address these issues (and others) in offering a system and method for mitigating JIT spraying attacks in a network environment. Embodiments of system 10 can protect an output (e.g., computer instructions in native machine code) of JIT compiler 26 against attacks during application execution from outside application 24 and JIT compiler 26. "Outside" application 24 (or JIT compiler 26) refers to a suitable location that is independent of, or outside the control of application 24 (or JIT compiler 26), for example, hypervisor 16, an operating system function, a library injected or loaded into application 24, etc. Because JIT compilers, such as JIT compiler 26 generally change their contents during program execution, protection of JIT compiler 26 from outside itself can be achieved according to embodiments of system 10 by intervention into JIT compiler 26 through entry points such as setting memory page permissions (e.g., execute, read, write, etc.) and fault generation (e.g., writing No Operations (NOPs) with jumps, int3, invalid opcodes, halt instructions, etc.).

Embodiments of system 10 may protect the output of JIT compiler 26 against spraying attacks during execution of application 24, for example, by intervening from outside application 24 into JIT page 44. In some embodiments, the intervening can comprise rewriting JIT page 44. In an example embodiment, the intervening can further comprise entering JIT page 44 triggered by a fault in JIT page 44. As used herein, a "fault" refers to a trap raised upon an attempt to access a memory page that is not loaded in physical memory.

In various embodiments, the output of JIT compiler 26 may be rendered unpredictable (e.g., different sequence of native instructions for two different compilations of a given input) by randomization. As used herein, the terms "randomization" and "randomize" refer to the process of transforming an ordered sequence of information to a random state, which may not follow a deterministic pattern, combination, or coherence. As JIT compiler 26 processes application 20 (including a portion thereof), it may cause JIT page 44 to be generated. Hypervisor 16 can mark the newly allocated JIT page 44 as non-executable, so that when the execution flow reaches JIT page 44 for a first time, a trap can be generated to notify hypervisor 16 to permit randomizer module 28 to handle the trap. Randomizer module 28 may receive the generated JIT page 44 as input and move a few randomly chosen blocks of instructions from JIT page 44 to shadow page 46. In various embodiments, every randomized JIT page 44 may include a corresponding shadow page 46.

When JIT page 44 is provided to randomizer module 28, instruction discovery module 34 may run an instruction discovery mechanism to find a valid sequence of instructions on JIT page 44. After finding the sequence, randomizer module 28 may randomly choose a few blocks of instructions and move them to shadow page 46. Jump inserter 42 may insert jumps (e.g., instructions that direct the processor to go to some other part of the executing program) between JIT page 44 and corresponding shadow page 46. Both the location and length of the blocks may be chosen randomly. The removed blocks from JIT page 44 as well as the unused areas of shadow page 46 may be filled by invalid opcodes (e.g., invalid opcodes refer to portions of machine language instructions that do not specify any computer operation to be performed; opcode specification and format may be laid out in an instruction set architecture of processor 20) or halt instructions by opcode generator 38. As used herein, "halt instructions" can include any instruction to stop or interrupt normal (e.g., regular, standard, ordinary, typical, customary) program execution.

If instruction control reaches such invalid opcodes during execution of application 20, a processor exception (e.g., interrupts that are generated internally by the processor when certain conditions are detected during the execution of a program; examples of such conditions include use of an invalid selector, use of a selector for which the program has insufficient privileges, etc.) can be thrown (e.g., generated) and execution of application 20 can be interrupted. Such opcodes can make it difficult to build attack vectors that try opportunistically to jump to certain JIT-allocated areas of memory by targeting to land in a sequence of instructions generated for well-crafted malicious inputs.

In some embodiments, to transfer control between JIT page 44 and corresponding shadow page 46, shadow page 46 may be allocated by the same application 20 that owns JIT page 44. When allocating shadow page 46, randomizer module 28 may inject an instruction block into application 20 to force it to allocate shadow page 46. Subsequently, randomizer module 28 may get control back from application 20 and move the blocks between JIT page 44 and corresponding shadow page 46.

JIT randomization may be completely transparent to application 20. In order to implement the transparency, randomized JIT page 44 may be marked by marker 40 as execute only and when JIT page 44 is about to be read from or written to; derandomizer module 32 may take control of JIT page 44 and derandomize (e.g., render randomized page back to original state before randomization) JIT page 44, for example, so that it can be read from or written to without generating an error. In such cases, corresponding shadow page 46 is freed and recycled for randomization of other JIT pages that belong to the same application 20.

Instructions on randomized JIT page 44 (or other pages) can jump to the removed blocks (e.g., blocks removed to corresponding shadow page 46) of JIT page 44. According to various embodiments, randomizer module 28 may differentiate between legitimate control transfers to valid instructions and invalid or malicious control transfers to the middle of instructions. Accordingly, randomizer module 28 may replace the first byte of a removed instruction with an interrupt instruction referred to herein as "int3" and the remaining bytes may be filled with invalid opcodes or halt instructions. Int3 can include a special one byte opcode (e.g., in x86 architecture) that calls the debug exception handler. Control transfers to the first byte of an instruction may hit an int3 that gives control back to randomizer module 28, but a control transfer to the middle of a removed instruction can trigger an exception and interrupt execution of application 20.

After randomizer module 28 takes control back triggered by the int3, it patches the zone of invalid opcodes in JIT page 44 and brings the instructions back to the actual page starting from the int3 address to the end of the block. The remaining portion of JIT page 44 may remain unaltered. Thereby, valid control transfers may be handled correctly and invalid control transfers may be discovered.

Turning to the infrastructure of system 10, system 10 may include other hardware that may be suitably coupled to host 12 in the form of consoles, user interfaces, memory management units (MMU), additional symmetric multiprocessing (SMP) elements, peripheral component interconnect (PCI) and corresponding bridges, small computer system interface (SCSI)/integrated drive electronics (IDE) elements, etc. In addition, suitable modems and/or network adapters may also be included for allowing network access by components of system 10. Any suitable operating systems may also be configured in components of system 10 to appropriately manage the operation of hardware components therein. Components of system 10 may include any other suitable hardware, software, components, modules, interfaces, or objects that facilitate the operations thereof. This may be inclusive of appropriate algorithms and communication protocols that facilitate operations related to mitigating JIT spraying attacks as detailed herein.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10. It should be understood that system 10 shown in FIG. 1 is simplified for ease of illustration.

Figure 2A:
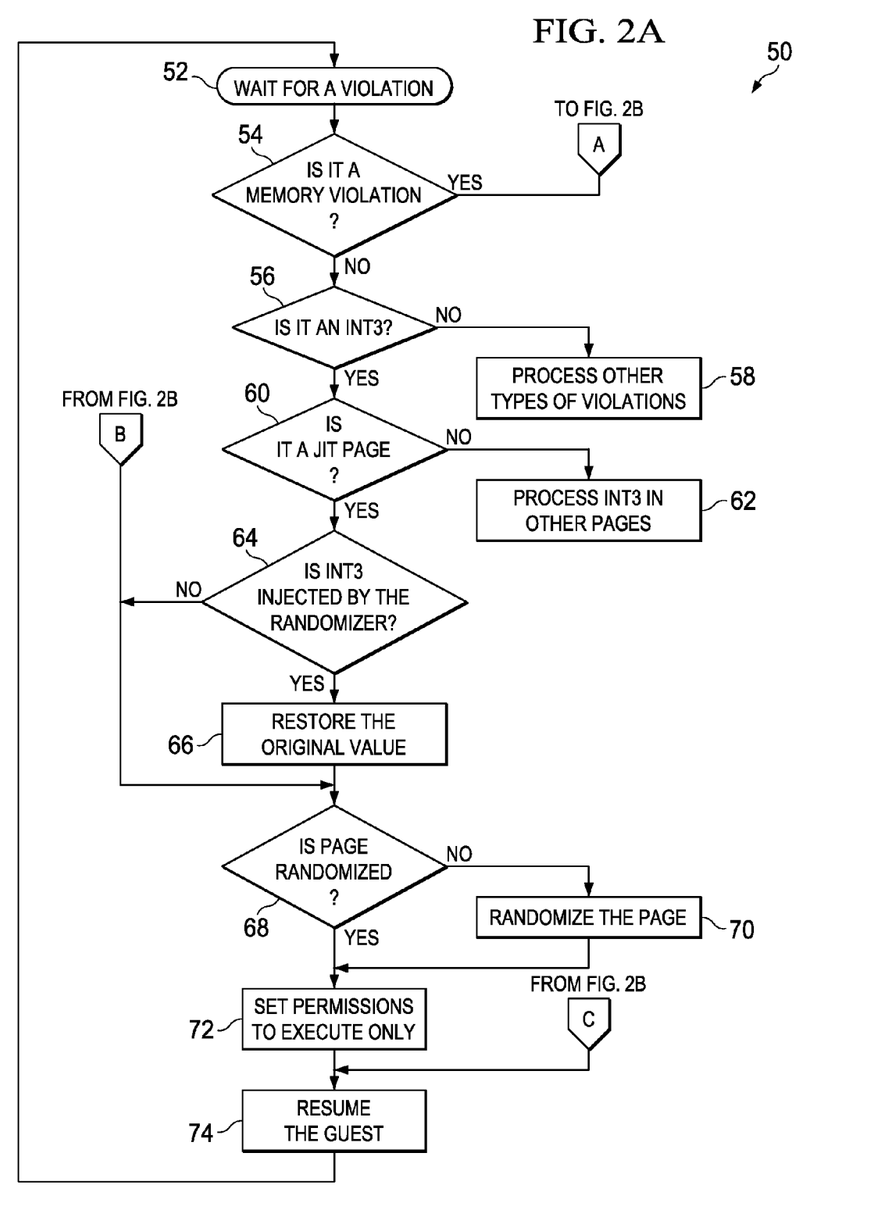
FIGS. 2A and 2B are simplified flow diagrams illustrating example operational activities that may be associated with embodiments of the system.
Figure 2B:
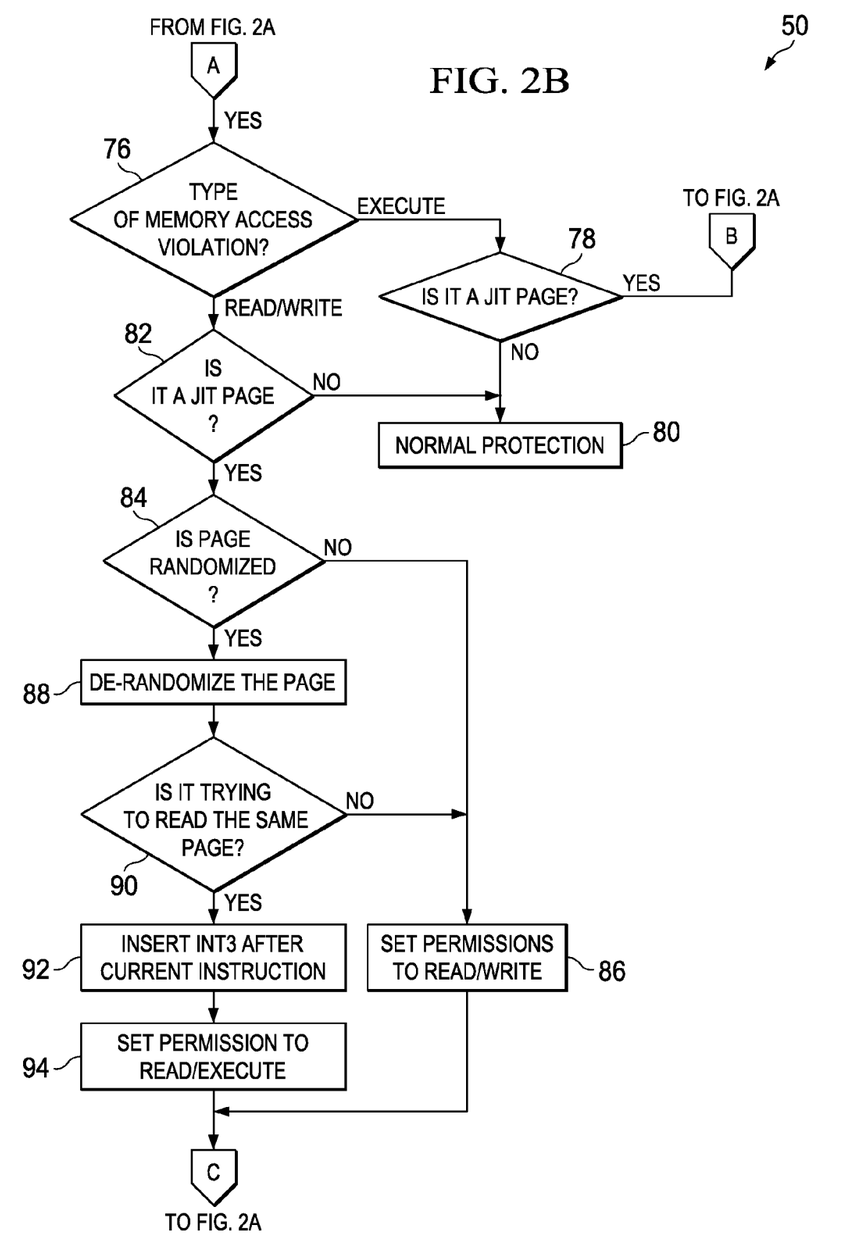

Turning to FIGS. 2A and 2B, FIGS. 2A and 2B are simplified flow diagrams illustrating example operations 50 that may be associated with an embodiment of system 10. At 52, the operations may start with waiting for a violation (e.g., fault, error, impermissible action, instruction that cannot be performed, etc.). At 54, a determination may be made whether the violation is a memory violation (e.g., attempt to read from or write to portion of memory that does not exist, or is not permitted to be accessed). If the violation is not a memory violation, at 56, a determination may be made whether the instruction is an int3. If the instruction is not an int3, at 58, suitable processes for managing other types of violations may be performed. If the instruction is an int3, at 60, a determination may be made whether the instruction attempting to execute from JIT page 44. If the instruction is attempting to execute from JIT page 44, at 62, the int3 may be processed in the page according to appropriate methods.

If the instruction is attempting to execute from JIT page 44, at 64, a determination may be made whether the int3 was injected by randomizer module 28 (for example, by locating the position of int3 in the block of instructions). If the int3 is injected by randomizer module 28, at 66, the original value of the instruction may be restored. The operations may proceed to determine at 68 whether JIT page 44 is randomized. If the int3 is not injected by randomizer module 28, the operations may proceed directly to 68. If JIT page 44 is not randomized, at 70, JIT page 44 may be randomized. At 72, permissions module 30 may set permissions on JIT page 44 to execute only. If JIT page 44 is randomized at 68, the operations may step directly to 72. At 74, execution of application 20 ("guest") may be resumed.

Turning back to 54, if the violation is determined to be a memory violation, at 76 in FIG. 2B, a determination may be made as to the type of memory access violation. If the memory access violation is an execute violation, at 78, a determination may be made whether the page from which the instruction is attempting to execute is JIT page 44. If the page is not JIT page 44, a normal protection mechanism (e.g., default mechanisms) may be invoked at 80. Otherwise, if the page is JIT page 44, the operations may step to 68 in FIG. 2A, and proceed thereafter.

Turning back to 76, if the memory access violation is a read/write violation, at 82, a determination may be made whether the page from which the instruction is attempting to execute is JIT page 44. If the page is not JIT page 44, a normal protection mechanism (e.g., default mechanisms) may be invoked at 80. Otherwise, if the page is JIT page 44, the operations may step to 84, at which a determination may be made whether JIT page 44 is randomized. If JIT page 44 is not randomized, at 86, permissions module 30 may set the permission to read (or write) as appropriate. The operations may step to 74, in FIG. 2A, at which execution of application 20 may be resumed.

Turning back to 84, if JIT page 44 is randomized, at 88, derandomizer module 32 may derandomize JIT page 44. At 90, a determination may be made whether the instruction is trying to read the same page. If not, the operations may step to 86. If the instruction is trying to read the same page, at 92, an int3 may be inserted after the current instruction attempting to execute, for example, to avoid frequent randomization and derandomization of JIT page 44 that is trying to read data from its own address range. At 94, permissions module 30 may set permission to read (or write), as appropriate. The operations may step to 74 in FIG. 2A, at which execution of application 20 may be resumed.

Figure 3:
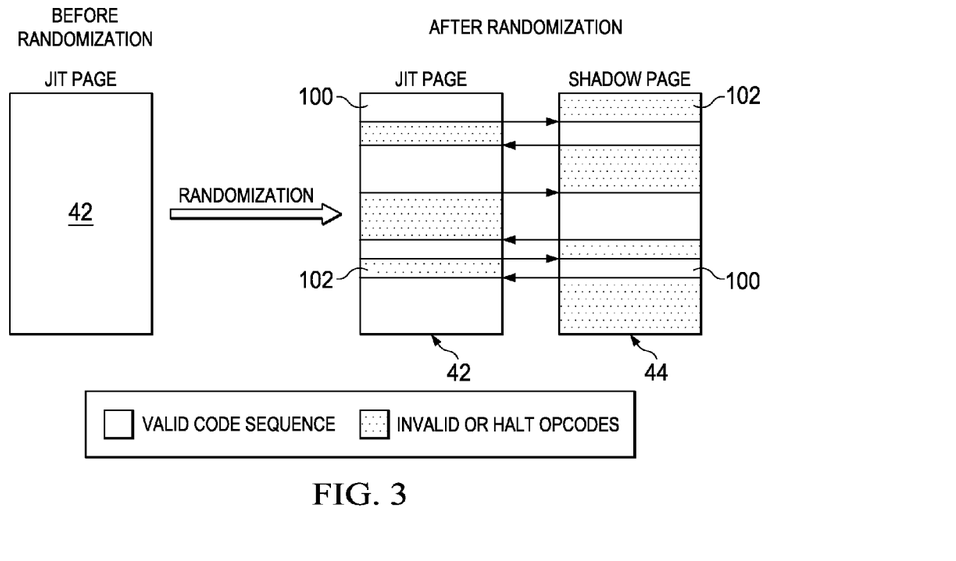
FIG. 3 is a simplified block diagram illustrating example details of the system according to an embodiment.

Turning to FIG. 3, FIG. 3 is a simplified block diagram illustrating example details of an embodiment of system 10. JIT page 44A may be generated by JIT compiler 26 during compilation/execution of application 20. Randomizer module 28 may randomize JIT page 44A to randomized JIT page 44B and corresponding shadow page 46, for example, by randomly selecting valid code sequence 100 (e.g., blocks of instructions) in JIT page 44A, moving them to shadow page 46, and replacing the moved valid code sequence 100 with invalid opcodes or halt instructions 102. Each valid code sequence 100 in JIT page 44B may correspond to invalid opcodes or halt instructions 102 in shadow page 46, and vice versa. In some embodiments, the start of each such invalid block 102 may include a jump instruction to transfer execution flow to corresponding valid block 100 on corresponding shadow page 46 (from JIT page 44B) or JIT page 44B (from shadow page 46).

Figure 4:
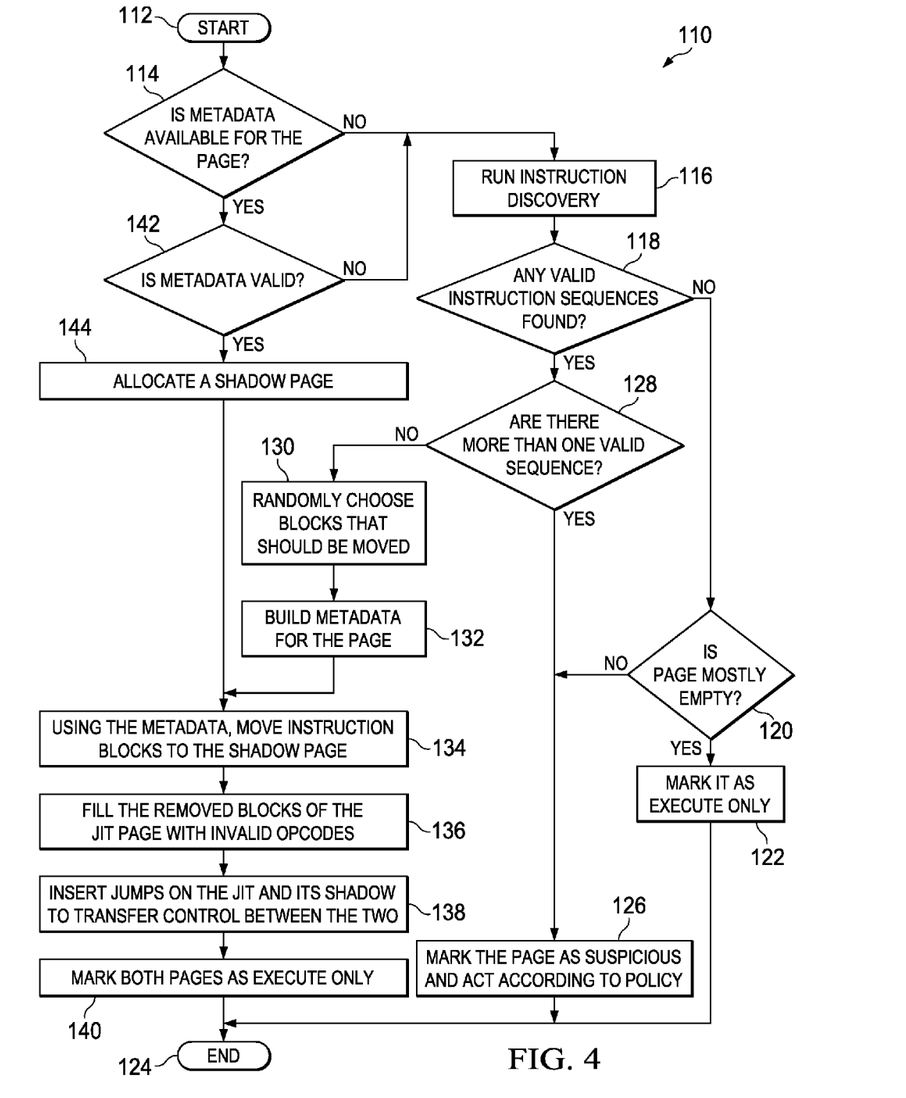
FIG. 4 is a simplified flow diagram illustrating other example operational activities that may be associated with embodiments of system.

Turning to FIG. 4, FIG. 4 is a simplified flow diagram illustrating example operations 110 that may be associated with embodiments of system 10. Operations 110 may start at 112. At 114, metadata builder 36 may determine whether metadata (e.g., information about the page, including the corresponding shadow page, blocks of instructions that have been moved, etc.) is available for JIT page 44 from which application 20 is attempting to execute. In some embodiments, metadata may be stored in hypervisor 16 for each JIT page 44 allocated to application 20. The metadata may be held valid as long as the page is not de-allocated (e.g., allocated to another application 20). If JIT page 44 is allocated to another application 20, the metadata may be discarded.

If metadata is not available for JIT page 44, at 116 instructions discovery module 34 may run instruction discovery, for example, by executing suitable heuristics to determine the instructions and sequence thereof on JIT page 44. At 118, a determination may be made whether any valid instruction sequence is found. If no valid instruction sequence is found, randomization may not be performed, and a determination may be made at 120 whether JIT page 44 is mostly empty. If JIT page 44 is mostly empty, at 122, JIT page 44 may be marked (e.g., by marker 40) as execute only, and the operations may end at 124.

Turning back to 126, if JIT page 44 is not empty, at 126, JIT page 44 may be marked as suspicious and acted upon accordingly (e.g., quarantined, deleted, exception thrown, etc.). The operations may step to 124, and end thereupon. Turning back to 118, if a valid instruction sequence is found, at 128, a determination may be made whether more than one valid sequence is present in JIT page 44. If more than one valid sequence is present in JIT page 44, the operations may step to 126, and JIT page 44 may be marked as suspicious. For example, when operations of JIT compiler 26 are infiltrated by malicious code, more than one valid sequence of instructions may be present in JIT page 44.

If more than one valid sequence is not present in JIT page 44, at 130, blocks of instructions may be randomly chosen to be moved to corresponding shadow page 46. At 132, metadata builder 36 may build (e.g., generate, create) metadata for the JIT page 44. At 134, using the metadata, randomizer module 28 may move instruction blocks to shadow page 46. At 136, the removed blocks of JIT page 44 may be replaced with invalid opcodes (or halt instructions). At 138, jump inserter 42 may insert jumps on JIT page 44 and corresponding shadow page 46 to transfer control between the two. At 140, JIT page 44 and shadow page 46 may be marked as execute only, and the operations may step to 124, whereupon they end.

Turning back to 114, if metadata is available for JIT page 44, a determination may be made at 142 whether the metadata is valid. If the metadata is not valid, the operations may step to 116, and continue thereafter. If the metadata is valid, shadow page 46 may be appropriately allocated at 144, and the operations may step to 134 and continue thereafter.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, hypervisor 16. In some embodiments, one or more of these features may be implemented in hardware, provided external to these elements, or consolidated in any appropriate manner to achieve the intended functionality. The various elements (e.g., randomizer module 28, permissions module 30, derandomizer module 32) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, processor 20 and memory element 22 associated with host 12 may be removed, or otherwise consolidated such that a single processor and a single memory element are responsible for certain activities; in other embodiments, processor 20 and memory element 22 may be distributed across a plurality of processors and memory elements. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 22) can store data used for the operations described herein. This includes the memory element being able to store instructions (e.g., software, logic, code, etc.) in non-transitory tangible computer readable media, such that the instructions are executed to carry out the activities described in this Specification. A processor can execute any type of instructions associated with the data to achieve the operations detailed herein in this Specification. In one example, processors (e.g., processor 20) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, system 10 may be applicable to other exchanges or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    protecting an output of a just-in-time (JIT) compiler against attacks during application execution at least by intervening from outside the application into a JIT page generated by the JIT compiler in a memory element of a host;
    generating a shadow page corresponding to the JIT page;
    randomly choosing at least one block of instructions in the JIT page;
    moving the at least one block of instructions to the shadow page; and
    replacing the at least one block of instructions in the JIT page with at least one of invalid opcodes and halt instructions.

2. The method of claim 1, wherein the intervening comprises rewriting the JIT page.

3. The method of claim 2, wherein the intervening further comprises entering the JIT page triggered by a fault in the JIT page.

4. The method of claim 1, further comprising generating metadata for the JIT page, wherein the metadata includes information related to the shadow page and a location of the at least one block of instructions in the JIT page.

5. The method of claim 1, further comprising inserting a jump instruction to transfer control to the shadow page when the at least one of invalid opcodes and halt instructions is encountered in the JIT page.

6. The method of claim 1, further comprising marking the JIT page and the shadow page as execute only.

7. The method of claim 1, further comprising discovering at least one valid instruction sequence in the JIT page.

8. The method of claim 1, further comprising marking the JIT page as suspicious if at least one condition is found from the group of conditions consisting of no valid instruction sequence in the JIT page and more than one valid instruction sequence in the JIT page.

9. The method of claim 1, wherein, if the JIT page is substantially empty, marking the JIT page as execute only.

10. The method of claim 1, further comprising setting a permission of the JIT page to execute if a memory access violation related to the JIT page indicates an execute violation.

11. The method of claim 1, further comprising derandomizing the JIT page if a memory access violation related to the JIT page indicates a read or write access violation.

12. The method of claim 11, further comprising inserting an int3 after a current instruction if the memory access violation indicates an attempt to repeat a read or write of the JIT page.

13. The method of claim 1, further comprising monitoring memory accesses in guest virtual machines from a hypervisor level daemon.

14. The method of claim 1, wherein randomization of the JIT page is transparent to application execution.

15. The method of claim 1, further comprising throwing a processor exception when invalid opcodes are found during application execution.

16. One or more non-transitory tangible media encoding logic that includes instructions for execution, which when executed by a processor, is operable to perform operations comprising:
   protecting an output of a JIT compiler against attacks during application execution at least by intervening from outside the application into a JIT page generated by the JIT compiler in a memory element of a host;
   generating a shadow page corresponding to the JIT page;
   randomly choosing at least one block of instructions in the JIT page;
   moving the at least one block of instructions to the shadow page; and
   replacing the at least one block of instructions in the JIT page with at least one of invalid opcodes and halt instructions.

17. The media of claim 16, wherein the operations further comprising generating metadata for the JIT page, wherein the metadata includes information related to the shadow page and a location of the at least one block of instructions in the JIT page.

18. The media of claim 16, wherein the operations further comprising inserting a jump instruction to transfer control to the shadow page when the at least one of invalid opcodes and halt instructions is encountered in the JIT page.

19. An apparatus, comprising:
   a memory element for storing data; and
   a processor that executes instructions associated with the data, wherein the processor and the memory element cooperate such that the apparatus is configured for:
      protecting an output of a JIT compiler against attacks during application execution at least by intervening from outside the application into a JIT page generated by the JIT compiler in a memory element of a host;
      generating a shadow page corresponding to the JIT page;
      randomly choosing at least one block of instructions in the JIT page;
      moving the at least one block of instructions to the shadow page; and
      replacing the at least one block of instructions in the JIT page with at least one of invalid opcodes and halt instructions.

20. The apparatus of claim 19, wherein the apparatus is further configured for generating metadata for the JIT page, wherein the metadata includes information related to the shadow page and a location of the at least one block of instructions in the JIT page.

* * * * *